United States Patent Office 2,812,329
Patented Nov. 5, 1957

2,812,329

HETEROCYCLIC NITROGEN COMPOUND POLYMER INHIBITORS

Robert E. Reusser, Bartlesville, and Anton M. Schnitzer, Dewey, Okla., assignors to Phillips Petroleum Company, a corporation of Delaware No Drawing. Application August 10, 1955, Serial No. 527,656

5 Claims. (Cl. 260—290)

This invention relates to a process for inhibiting polymerization of polymerizable heterocyclic compounds containing a hetero nitrogen atom. In one of its aspects, this invention relates to the inhibiting of polymerization of alkenyl-substituted heterocyclic nitrogen-containing compounds. In still another aspect, this invention relates to the inhibiting of the formation of polymer in vinyl-pyridine compounds.

The words "inhibit" and "stabilize" are used in this specification and the attached claims are used to mean that the formation of polymer is materially reduced or prevented, and do not imply any mechanism for accomplishing this purpose.

Alkenyl-substituted heterocyclic nitrogen-containing compounds are frequently produced by dehydrogenation of the corresponding alkyl-substituted compound. The dehydrogenation is not complete and the resulting mixture is separated into its component parts, chiefly alkyl and alkenyl-substituted nitrogen-containing heterocyclic ring compounds, by suitable means such as distillation. However, the tendency of the alkenyl-substituted compound to polymerize is a major difficulty encountered in the manufacture and storage of these compounds. As this tendency is enhanced by elevated temperature, the separation of the alkenyl-substituted compound from other constituents by distillation is extremely difficult due to the formation of polymer within the distillation column and auxiliary equipment.

In the processing of alkenyl-substituted heterocyclic nitrogen-containing compounds, polymerization occurs which manifests itself in two ways. Soluble polymers are formed which are evidenced by an increase in viscosity, and ultimately, by forming a solid mass. Also formed are insoluble polymers or proliferous polymers referred to in the trade, and herein, as "popcorn" polymers. The popcorn polymer is insoluble in the heterocyclic nitrogen compound and in other organic compounds, and when in contact with a monomer, it continues to grow. This problem is particularly acute in the manufacture, processing and storing of vinyl-substituted pyridines obtained by the dehydrogenation of the corresponding ethyl-substituted pyridines.

Of the various methods used to solve this polymer problem, the addition of a stabilizing agent or a polymerization inhibitor is the most effective method on the over-all basis. However, polymerization inhibitors which have been used for such monomers as styrene are frequently not adaptable for use in inhibiting the polymerization of vinyl-substituted heterocyclic nitrogen compounds due to the greater tendency of these vinyl heterocyclic nitrogen compounds to polymerize. Furthermore, care must be taken to select a compound for use as a polymerization inhibitor which will inhibit polymerization during processing and storage, but which may be readily removed from the stabilized monomer when it is desired to polymerize the monomer, as for example, in the manufacture of synthetic fibers.

Another difficulty encountered in the process of adding a stabilizing agent to these alkenyl-substituted heterocyclic nitrogen-containing compounds is that the inhibitor which is effective in preventing the formation of soluble polymer is frequently only partially effective in preventing the formation of popcorn polymer, or the reverse can be true. Also, an inhibitor at one temperature is not necessarily useful at another temperature.

An object of this invention is to provide a method of stabilizing alkenyl-substituted heterocyclic nitrogen-containing compounds against polymerization.

Another object of this invention is to provide an alkenyl-substituted heterocyclic nitrogen-containing compound stabilized against polymerization.

Still another object of this invention is to provide a novel polymerization inhibitor effective against both soluble and popcorn polymer formation in alkenyl-substituted heterocyclic nitrogen-containing compounds.

Still another object of this invention is to provide a polymerization inhibitor especially useful in a distillation column wherein alkenyl-substituted heterocyclic nitrogen-containing monomers are being separated from other compounds.

Still other objects and advantages of this invention will be apparent to those skilled in the art having been given this disclosure.

It is now discovered that the indigo, thioindigo, and indigo-thioindigo dyes of the following general formula are effective in inhibiting the polymerization of vinyl-pyridines and other polymerizable heterocyclic nitrogen compounds at ambient temperatures, and at conditions of elevated temperature, i. e., process and storage conditions:

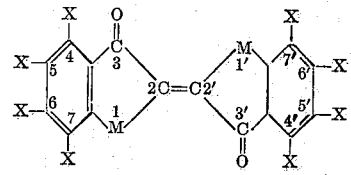

In the above general formula M can be

or —S— and one M can be

and the other —S—. X is selected from the group consisting of hydrogen, chlorine, bromine, an alkyl containing up to 3 carbon atoms, a sulfo radical, an alkali metal salt of a sulfo radical, a nitro radical, an amino radical, an ethoxy radical, a methoxy radical, and wherein two adjacent X's can be carbon atoms in a benzo group, and wherein at least two of said X's are hydrogen.

Some examples of compounds of the above general formula which are effective polymerization inhibitors by the method of this invention are: Indigo; 5-chloroindigo; 5,5',7-trichloroindigo; 5,5'-dibromoindigo; 5,5',7,7'-tetrabromoindigo; 4,4',5,5',7,7'-hexabromoindigo; 5-indigosulfonic acid; 5,5',7-indigotrisulfonic acid; 5,5',7,7'-tetrabromo-6,6'-diaminoindigo; 6-ethoxyindigo; 5-methyl-7'-indigosulfonic acid (sodium salt); 4,5,4',5'-dibenzoindigotin; 7'-methoxyindigo; thioindigo; 5,5'-dichloro-7,7'-dimethylthioindigo; 6,6'-diethoxythioindigo; 6,6'-dichloro-4,4'-dimethylthioindigo; indigo-thioindigo; 4-methyl-5-chloro-7-methoxy-2-indol-5',7'-dichloro-2'-thionaphthene-indigo (Indanthrene Printing Blue B dye); 5,7-dichloro-2-indol-5',6'-dichloro-2'-thionaptheneindigo (Indanthrene Printing Violet BBF dye); 4,5,4',5'-dibenzothioindigo (Indanthrene Brown RRD), and 5-bromo-2-indol-6',7'-benzo-2'-thionaphtheneindigo. In particular, these compounds, when used in the range of 0.01 to 5 weight percent based on the polymerizable compound, are effective inhibitors for the stabilization against polymerization of substituted pyridines having at least one vinyl substituent such as 2,3, and 4 vinylpyridine, alkylvinylpyridines such as 2-methyl-5-ethylpyridine, 2-vinyl-5-ethylpyridine, 3-ethyl-5-vinylpyridines, 3-dodecyl-4-vinylpyridine, 2,4-dimethyl-3-vinylpyridine, and similar compounds.

According to this invention, polymerizable heterocyclic nitrogen-containing compounds are stabilized against polymerization by the addition of an indigo, thioindigo or indigo-thioindigo of the type described.

In general, the amount of inhibitor used will be in the range of 0.01 weight percent to 5 weight percent based on the polymerizable compounds with an amount in the range of 0.05 to 2 weight percent being most frequently used and most frequently 0.1 to 1 percent will be used. It will be understood by those skilled in the art that lesser amounts can be used but may not provide adequate protection while greater amounts are not ordinarily required.

Both the soluble and popcorn polymer formation are inhibited by the compounds of this invention. These inhibitors are particularly useful in distillation processes since the material is effective both in the pot and in the column, however, these inhibitors are also effective as storage inhibitors.

One group of polymerizable heterocyclic nitrogen compounds which are inhibited in accordance with our invention comprises the vinylpyridines with the vinyl group being present in any of the several positions in the pyridine ring. Alkyl groups can be present on the ring or on the alpha carbon atoms of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups, at least one of said groups being vinyl or alpha-methylvinyl; and the total number of carbon atoms in the alkyl groups being not greater than 12. Examples of such compounds include 2-vinylpyridine; 3-vinylpyridine; 4-vinylpyridine; 2,3,4-trimethyl-5-vinylpyridine; 3,4,5,6-tetramethyl-2-vinylpyridine; 2-methyl-5-vinylpyridine; 3-ethyl-5-vinylpyridine; 2,6-diethyl-4-vinylpyridine; 2-isopropyl-4-nonyl-5-vinylpyridine; 2-methyl-5-undecyl-6-vinylpyridine; 3 - dodecyl - 4 - vinylpyridine; 2,4-dimethyl-5,6-dipentyl-3-vinylpyridine; 3-(alpha-methylvinyl)pyridine; and similar substituted alkene and alkadiene pyridines.

Other polymerizable heterocyclic compounds containing a hetero nitrogen atom stabilized by the method of this invention are those alkene substituted heterocyclic nitrogen compounds in which the ring structure is unsaturated, partially saturated, and completely saturated. That is, such compounds as alkene substituted pyridines, quinolines, isoquinolines, piperidines, pyrroles, pyrrolidines, pyrrolidones, alkyl derivatives of the foregoing compounds, dihydro and tetrahydropyridines, partially hydrogenated quinolines, isoquinolines, and pyrrolines (dihydropyrroles). Of special importance are the vinyl and alpha-methylvinyl substituted derivatives of these heterocyclic nitrogen containing compounds, examples of which are 2-vinylquinoline; 8-ethyl-2-vinylquinoline; 4-hexyl-5-vinylquinoline; 1-vinyl-isoquinoline; 5-methyl-1-isopropenyl - isoquinoline; vinylpyrrolidone; vinylpyrrole; vinylpiperidine; vinylpyrrolidine and the like. That is, the heterocyclic nitrogen containing compound usually will contain a sole heterocyclic nitrogen atom. Normally the alkene, alkadiene or alkyne substituents will be attached to a ring carbon atom. However, in compounds wherein the ring carbon atom is a secondary nitrogen atom, the vinyl group can be attached to this ring nitrogen atom. For example, N-vinylcarbazole and N-vinylpyrrolidone. The inhibitors of this invention are particularly applicable to separation by distillation of organic mixtures containing a substantial proportion of vinylpyridine compound. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, 5-methyl-2-vinylpyridine, and the like.

When the indigo dyes of this invention are used as inhibitors during the separation of vinyl-substituted heterocyclic nitrogen compound from saturated heterocyclic nitrogen compounds; such as for example, the distillation of 2-methyl-5-vinylpyridine from 2-methyl-5-ethylpyridine, the inhibitor can be added to the feed at the distillation column. Addition may be made at any point along the column or the inhibitors can be added at either the top of the column or in the column reflux.

The heterocyclic compound containing a hetero nitrogen atom of particular commercial importance is 2-methyl-5-vinylpyridine (MVP). For that reason, we will illustrate how our invention is useful in inhibiting polymer formation using 2-methyl-5-vinylpyridine and indigo in the separation of 2-methyl-5-vinylpyridine from 2-methyl-5-ethylpyridine. It will be understood by those skilled in the art that the heterocyclic nitrogen containing compounds as disclosed can be similarly inhibited against polymerization by the other indigo derivatives disclosed and are effective in the presence or absence of water, air, metals, etc.

EXAMPLE I

Indigo was tested for its effectiveness as an inhibitor of soluble polymer formation in 2-methyl-5-vinylpyridine (MVP) by the following procedure. Samples of MVP containing 5 weight percent water were placed in vials and to each vial was added a small piece of steel and a small amount of the inhibitor, indigo. The vials were then flushed with nitrogen and sealed tightly with screw-on tops. The vials were then placed in an oven and maintained at 185° F. for 16 hours, after which a weighed sample of the contents of each vial was evaporated under vaccum and over boiling water. The residue which remained, with allowance for the weight of inhibitor present, was considered to be soluble polymer. The results of these tests are given below in Table I.

Table I

| Inhibitor | Amount of Inhibitor Used, Wt. Percent Based on MVP | Amount of Soluble Polymer Formed (Weight Percent) Avg. of Two Runs |
|---|---|---|
| Indigo | 0.1 | 1.73 |
| Indigo | 0.3 | 1.20 |
| Indigo | 0.6 | 0.90 |
| Control | None | 25 |

EXAMPLE II

Indigo was also tested for its effectiveness as an inhibitor toward polymerization by the following method. Weighed samples of 2-methyl-5-vinylpyridine containing 5 weight percent water and 0.3 percent indigo (weight % based on MVP) were refluxed for 16 hours at 185° F. under conditions of total reflux. A glass column, two feet long and three-quarters of an inch inside diameter was used. A small piece of wood having two inches of one-sixteenth inch diameter steel wire wrapped around it was used as a boiling chip. The pressure was adjusted to keep the temperature of the liquid in the kettle at 185° F. and this pressure was calculated to be approximately 250 millimeters of mercury. After this refluxing period was completed, the samples were evaporated under vacuum and over boiling water. The residue which remained, with allowance for the weight of inhibitor present, was considered to be soluble polymer. Two runs were made by the above procedure, each run having duplicate polymer analysis. For the first run, the values are 0.74 and 0.77 and for the second run 0.84 and 0.81, respectively (all percentages based on MVP). A control run in which no polymerization inhibitor was present gave 25% soluble polymer.

EXAMPLE III

A group of tests was made using indigo to determine its effectiveness as an inhibitor for the formation of insoluble or "popcorn" polymer in 2-methyl-5-vinylpyridine. Samples of the 2-methyl-5-vinylpyridine were prepared in vials as is described above in Example I, these samples containing about 5 percent water. To each sample was added 0.3 weight percent divinylbenzene and the stated amount of the inhibitor. The inhibitor was added to the sample after the sample had been allowed to stand for about 5 hours at 185° F. This five hour period of incubation produced a small seed of popcorn polymer after which the inhibitors were added to the sample. The control was prepared in the same way except that no inhibitor was placed in this sample. The vials were placed in an oven maintained at 185° F. and the results of these tests are noted below in Table II.

*Table II*

| Inhibitor | Amount of Inhibitor Used (Weight Percent) | Results |
| --- | --- | --- |
| Indigo | 0.1 | 5% polymer in 20 days—Growth then stopped. |
| Control | (No inhibitor) | 100% "popcorn" polymer in 8 hours. |

EXAMPLE IV

A further series of tests was made for ascertaining the effectiveness of indigo as an inhibitor for popcorn polymer formation in 2-methyl-5-vinylpyridine. The samples were prepared in vials as is described in Example I. Each sample of the 2-methyl-5-vinylpyridine was "seeded," initially, by placing several seeds of popcorn polymer into each test vial at the beginning of the test. Each sample contained 5 weight percent water and 0.3 weight percent divinylbenzene. The control was prepared in the same way except that no inhibitor was added. The results of these tests are reported below in Table III.

*Table III*

| Inhibitor | Amount of Inhibitor Used (Weight Percent) | Results |
| --- | --- | --- |
| Indigo | 0.1 | No "popcorn" polymer formed in 20 days. |
| Control | | 100% polymer in 3 hours. |

EXAMPLE V

Indigo was tested to determine its effectiveness as a polymerization inhibitor for MVP under conditions of storage and/or transit.

Flashed MVP to which had been added 0.1% by weight indigo was charged to a No. 1 laboratory vial. Thirty-five percent of the volume of each vial was left empty to simulate storage conditions. A one-inch long piece of 1/16" diameter steel wire was placed in the vial, a tin foil lid was placed on the vial, and the cap was sealed on with sealing wax. The vial was then stored for three weeks at 100° F. At the end of this period, the amount of soluble polymer in the vial was determined by precipitating out the polymer in n-hexane, filtering the polymer, drying and weighing. The amount of polymer formed in this run was 2.72 percent by weight. A similar run in which no inhibitor was added was analyzed by the precipitation method, and 22.25% by weight polymer was found to be present.

EXAMPLE VI

A run was made to determine whether or not indigo would steam distill into the overhead when inhibited MVP is subjected to a steam distillation to separate the MVP from MEP, 2-methyl-5-ethylpyridine.

To a mixture of 100 grams of flashed MVP and 200 cc. of water was added two grams of indigo. This mixture was then charged to the kettle of a steam distillation column. The organic overhead was colorless as determined by a Gardner color scale. After the MVP was all taken overhead, the water which came over was also colorless.

We claim:

1. A process for inhibiting the formation of a polymer in a distillation zone in which a mixture comprising a vinylpyridine is being distilled, said process comprising introducing into the feed of said distillation zone from 0.05 percent to 2 percent by weight, based on the weight of said vinylpyridine in said feed, of an indigo.

2. A process for inhibiting polymer formation in a mixture of organic compounds comprising 2-methyl-5-vinylpyridine, said process comprising adding to said mixture from 0.01 to 5 weight percent, based on the weight of said 2-methyl-5-vinylpyridine, of an indigo.

3. As a composition of matter, 2-methyl-5-vinylpyridine having incorporated therein indigo in an amount in the range of 0.05 to 2 weight percent based on the weight of said 2-methyl-5-vinylpyridine.

4. A process for inhibiting polymer formation in a vinylpyridine which comprises incorporating a stabilizing amount of an indigo.

5. As a composition of matter, a vinylpyridine stabilized against polymerization with a stabilizing amount of an indigo.

No references cited.